US012688840B2

(12) United States Patent
Chen et al.

(10) Patent No.: US 12,688,840 B2
(45) Date of Patent: Jul. 21, 2026

(54) ELECTRONIC DEVICE WITH DISPLAY LIGHT SENSOR

(71) Applicant: Apple Inc., Cupertino, CA (US)

(72) Inventors: Tong Chen, Fremont, CA (US); Wenrui Cai, Saratoga, CA (US); Jenny Hu, Sunnyvale, CA (US); Clint M Perlaki, San Jose, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 18/611,276

(22) Filed: Mar. 20, 2024

(65) Prior Publication Data

US 2024/0363088 A1 Oct. 31, 2024

Related U.S. Application Data

(60) Provisional application No. 63/498,405, filed on Apr. 26, 2023.

(51) Int. Cl.
*G09G 5/10* (2006.01)

(52) U.S. Cl.
CPC ........... *G09G 5/10* (2013.01); *G09G 2310/08* (2013.01); *G09G 2360/144* (2013.01); *G09G 2360/145* (2013.01)

(58) Field of Classification Search
CPC ................. G09G 5/10; G09G 2310/08; G09G 2360/144; G09G 2360/145; G09G 3/006; G09G 2320/0214; G09G 2330/12; G09G 2360/14; H10K 59/60; H10F 39/18
See application file for complete search history.

(56) References Cited

U.S. PATENT DOCUMENTS

| | | | | |
|---|---|---|---|---|
| 8,761,539 | B2 | 6/2014 | Kerofsky et al. | |
| 8,988,682 | B2 | 3/2015 | Yin et al. | |
| 9,530,381 | B1 | 12/2016 | Bozarth et al. | |
| 10,881,310 | B2 | 1/2021 | Giovangrandi | |
| 11,239,446 | B2 * | 2/2022 | Chung ................. | H10K 77/111 |
| 11,482,142 | B2 | 10/2022 | Vlachos | |
| 2006/0044299 | A1 | 3/2006 | Wang et al. | |
| 2020/0111851 | A1 * | 4/2020 | Park ...................... | G06F 3/0412 |
| 2022/0336560 | A1 * | 10/2022 | Barel .................. | H10K 59/126 |

FOREIGN PATENT DOCUMENTS

| | | | |
|---|---|---|---|
| KR | 20220078191 | A | 6/2022 |
| WO | 2018081151 | A1 | 5/2018 |

* cited by examiner

*Primary Examiner* — Pegeman Karimi
(74) *Attorney, Agent, or Firm* — Treyz Law Group, P.C.; David K. Cole

(57) ABSTRACT

A light emitter that operates through a display may cause display artifacts, even when the light emitter operates using non-visible wavelengths. To determine whether the light emitter has caused these artifacts, a display light sensor under the display may measure backside light leakage from the display. Based on the measured backside light leakage, the display light sensor or control circuitry may determine whether artifacts in the display exceed a predetermined acceptable artifact range. If the artifacts exceed this range, the artifacts may be mitigated. To mitigate the artifacts, the light emitter and/or the display may be adjusted. For example, the timing and/or dosage of the light emitter, the acceptable artifact range, and/or the timing of display content may be adjusted. In this way, the display light sensor may be used to form a closed-loop system to determine whether artifacts are present in the display and to mitigate those artifacts.

18 Claims, 12 Drawing Sheets

ELECTRONIC DEVICE WITH DISPLAY LIGHT SENSOR

This application claims the benefit of U.S. provisional patent application No. 63/498,405, filed Apr. 26, 2023, which is hereby incorporated by reference herein in its entirety.

BACKGROUND

This relates generally to electronic devices, and, more particularly, to electronic devices with displays.

Electronic devices may include displays. Environmental sensors or other sensors may also be included in the electronic devices.

SUMMARY

An electronic device may include a display with pixels, a sensor (such as a proximity sensor) with a light emitter that emits light through the display, and control circuitry. The light emitter that operates through a display may cause display artifacts, even when the light emitter operates using non-visible wavelengths, such as infrared wavelengths. These display artifacts may be referred to as emitter artifacts herein. In particular, emitted light may interfere with circuitry in the display, causing the emitter artifacts.

To determine whether the light emitter has caused the emitter artifacts, a display light sensor under the display may measure backside light leakage from the display. The display light sensor may be an ambient light sensor, a camera, or other light sensor. Based on the measured backside light leakage, the display light sensor or control circuitry in the electronic device may determine whether artifacts in the display exceed a predetermined acceptable artifact range.

If the artifacts exceed this range, the artifacts may be mitigated. To mitigate the artifacts, the light emitter and/or the display may be adjusted. For example, the timing and/or dosage of the light emitter, the acceptable artifact range, and/or the timing of display content may be adjusted. In this way, the display light sensor may be used to form a closed-loop system to determine whether artifacts are present in the display and to mitigate those artifacts.

DETAILED DESCRIPTION

Electronic devices may include displays and sensors, such as environmental sensors. For example, an electronic device may include a housing and a display and sensor on the front face of the housing. To increase the size of the display or to otherwise reposition the sensor, the sensor may be incorporated behind the display and operate through the display. The sensor may include a light emitter and a sensor. However, arranging the sensor in this way may create signal and artifact issues, as the light emitter may interfere with pixels in the display.

To help mitigate these issues, a display light sensor may be incorporated behind the display to measure the backplane leakage from the display and determine whether artifacts are present in displayed images. The artifacts may be compared to an acceptable artifact range. If artifacts are found outside of the acceptable artifact range, the display and/or sensor may be adjusted. For example, control circuitry may adjust the output of the light emitter (e.g., the firing dosage of the light emitter), adjust the timing of the light emitter (e.g., the firing time), increase the acceptable artifact range, offset the emission of pixels in the display, or take another action. By incorporating the display light sensor behind the display, a closed-loop system may be formed, and an under-display environmental sensor may be used without interfering with the functionality/appearance of the display.

Figure 1:
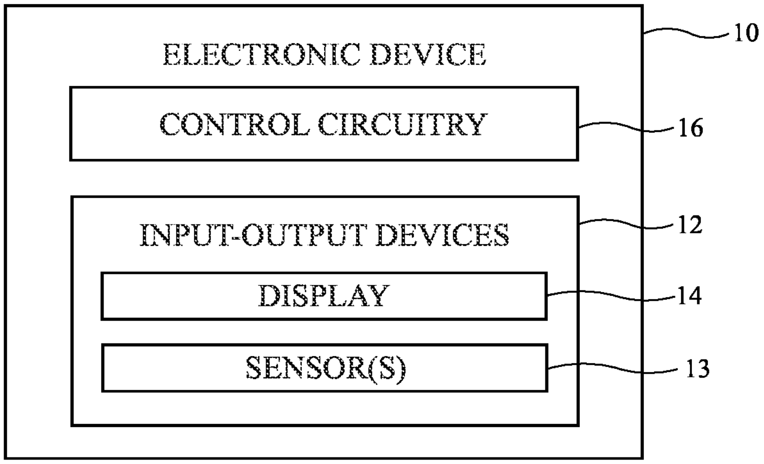
FIG. 1 is a schematic diagram of an illustrative electronic device having a display and one or more sensors in accordance with some embodiments.

An illustrative electronic device of the type that may be provided with a display and a sensor is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10, including components, such as input-output devices 12, in device 10. The processing circuitry may be based on one or more microprocessors, microcontrollers, digital signal processors, baseband processors, power management units, audio chips, and/or application-specific integrated circuits, as examples.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, and/or data ports, as examples. A user may control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Display 14 may be an organic light-emitting diode display, a display formed from an array of discrete light-emitting diodes (microLEDs) each formed from a crystalline semiconductor die, a liquid crystal display, an organic light emitting diode (OLED) display, or any other suitable type of display. Device configurations in which display 14 is an organic light-emitting diode display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Control circuitry 16 may be used to run software on device 10 such as operating system code and applications. During operation of device 10, the software running on control circuitry 16 may display images on display 14.

Input-output devices 12 may also include one or more sensors 13 such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. In accordance with some embodiments, sensors 13 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 13 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Figure 2:
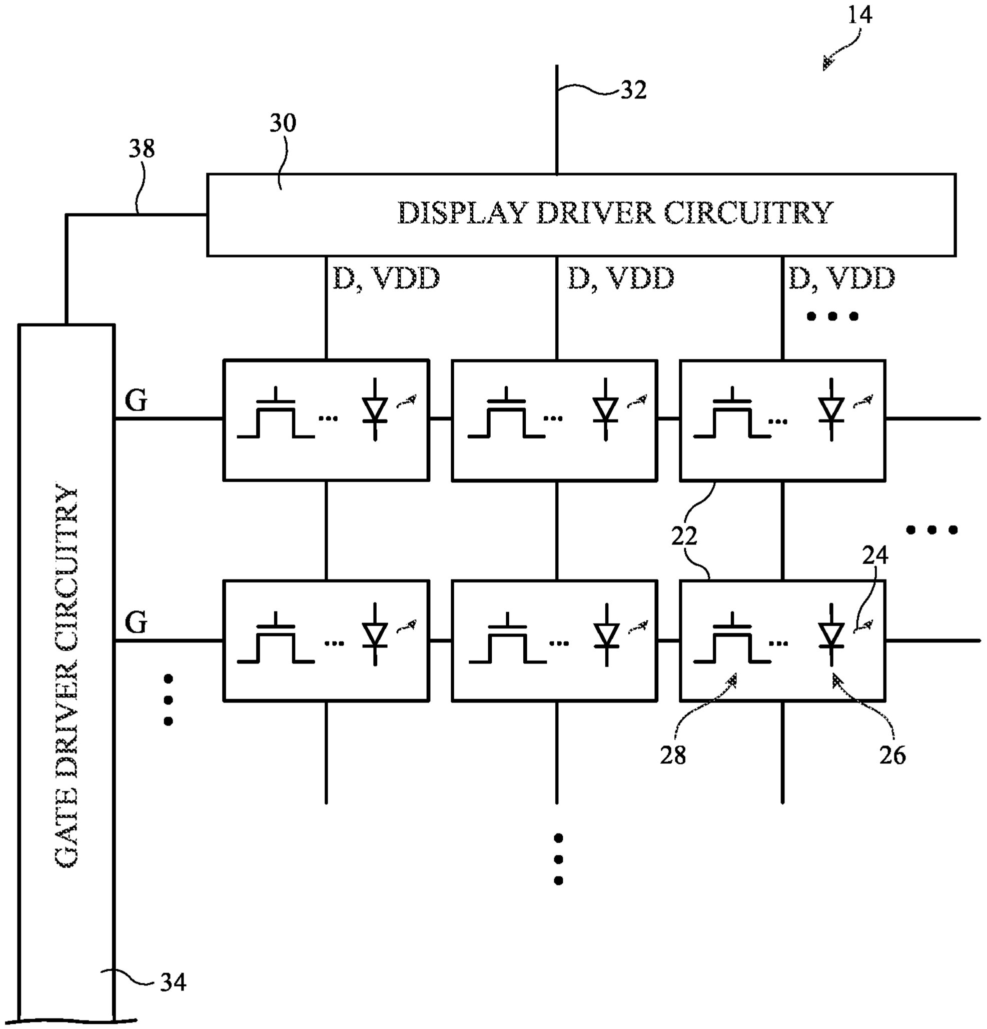
FIG. 2 is a schematic diagram of an illustrative display with light-emitting elements in accordance with some embodiments.

A top view of a portion of display 14 is shown in FIG. 2. As shown in FIG. 2, display 14 may have an array of pixels 22 formed on a substrate. Pixels 22 may receive data signals over signal paths such as data lines D and may receive one or more control signals over control signal paths such as horizontal control lines G (sometimes referred to as gate lines, scan lines, or emission control lines). There may be any suitable number of rows and columns of pixels 22 in display 14 (e.g., tens or more, hundreds or more, or thousands or more). Each pixel 22 may include a light-emitting diode 26 that emits light 24 under the control of a pixel control circuit formed from thin-film transistor circuitry such as thin-film transistors 28 and thin-film capacitors. Thin-film transistors 28 may be polysilicon thin-film transistors, semiconducting-oxide thin-film transistors such as indium zinc gallium oxide (IGZO) transistors, or thin-film transistors formed from other semiconductors. Pixels 22 may contain light-emitting diodes of different colors (e.g., red, green, and blue) to provide display 14 with the ability to display color images or may be monochromatic pixels.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply display driver circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14.

Gate driver circuitry 34 (sometimes referred to as row control circuitry) may be implemented as part of an integrated circuit and/or may be implemented using thin-film transistor circuitry. Horizontal control lines G in display 14 may carry gate line signals such as scan line signals, emission enable control signals, and other horizontal control signals for controlling the display pixels 22 of each row. There may be any suitable number of horizontal control signals per row of pixels 22 (e.g., one or more row control signals, two or more row control signals, three or more row control signals, four or more row control signals, etc.).

The region on display 14 where the display pixels 22 are formed may sometimes be referred to herein as the active area. Electronic device 10 has an external housing with a peripheral edge. The region surrounding the active area and within the peripheral edge of device 10 is the border region (also referred to as the inactive area herein). Images may be displayed to a user of the device in the active region. It may be desirable to minimize the border region of device 10. For example, device 10 may be provided with a full-face display 14 that extends across the entire front face of the device. If desired, display 14 may also wrap around over the edge of the front face so that at least part of the lateral edges or at least part of the back surface of device 10 is used for display purposes.

Figure 3:
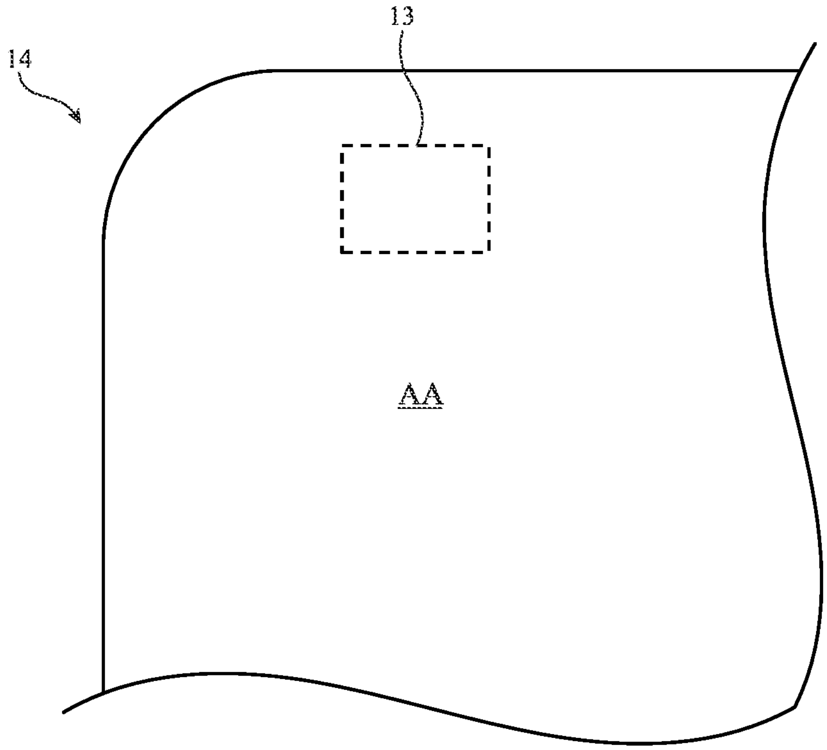
FIG. 3 is a top view of an illustrative display with an underlying sensor in accordance with some embodiments.

Device 10 may include a sensor 13 mounted behind display 14 (e.g., behind the active area of the display). FIG. 3 is a top view of an illustrative display 14 with a sensor 13 mounted behind the active area (AA) of the display. Sensor 13 may include a light-emitting component in addition to a sensor component. As one illustrative example, sensor 13 may be a proximity sensor that includes a light source in addition to a light sensor. The light source is configured to emit light, such as infrared light, through the active area of the display from underneath the active area of the display. The light sensor is configured to sense reflections (e.g., off of an external object) of the emitted light that pass through the active area of the display to the light sensor. The light source may emit light in a series of pulses at a desired frequency. Each pulse has a desired duration. The properties of the pulses (e.g., frequency, duration, wavelength, intensity, etc.) may sometimes be referred to as a firing mode for the emitter.

To mitigate the impact of sensor 13 on the operation of display 14, sensor 13 may include a light emitter that operates using non-visible-wavelength light. For example, sensor 13 may include an infrared (IR) light emitter or an ultraviolet (UV) light emitter and may have a corresponding light sensor (e.g., an IR light sensor for an IR light emitter or a UV light sensor for a UV light emitter). Using a light emitter that operates using non-visible-wavelength light may prevent the light emitted by the light emitter from being directly observed by a viewer of display 14. However, the light emitter may cause visible artifacts in display 14.

As previously mentioned, display 14 includes thin-film transistor circuitry that may include polysilicon thin-film transistors, semiconducting-oxide thin-film transistors such as indium zinc gallium oxide (IGZO) transistors, and/or thin-film transistors formed from other semiconductors. Additionally, display 14 may include one or more organic layers that form organic light-emitting diode pixels in an organic light-emitting diode display. One or more materials in the thin-film transistor circuitry and the organic layers that form pixels 22 may be photosensitive to non-visible-wavelength light. Therefore, even if sensor 13 includes a light emitter that uses non-visible-wavelength light, emissions of the non-visible-wavelength light may cause display artifacts in the localized region of the display that overlaps the light emitter.

Display artifacts caused by emission of the light emitter in sensor 13 may include causing a region of the display over the light emitter to have a different brightness or color than the surrounding portions of the display. The artifacts may be static or may be transient (e.g., may rapidly appear and disappear so as to have the appearance of blinking). The artifacts may be more visible in a dark ambient light environment than in a bright ambient light environment.

The type and severity of the display artifacts caused by emission of the light emitter in sensor 13 may depend on emitter wavelength, emitter beam size, emitter irradiation level, emitter pulse duration, emitter firing rate, display panel architecture, display OLED design, display TFT design, the brightness of content on the display over the emitter, the color of content on the display over the emitter, display refresh rate, and/or temperature, as examples.

Electronic device 10 may be designed to ensure that display artifacts caused by emission of the light emitter in sensor 13 are mitigated at least to below a just-noticeable difference (JND) level (also referred to as a just-noticeable artifact level herein). At or above the JND level, the display artifacts may be detectable to the viewer. Below the JND level, the display artifacts may not be detectable to the viewer. By mitigating display artifacts to below the JND level, the display artifacts may be effectively eliminated from the viewer experience.

Display artifacts caused by emission of the light emitter in sensor 13 may hereinafter be referred to as emitter artifacts. One way to mitigate emitter artifacts is to tune the properties of the emitter itself. Generally, reducing the firing dosage of the emitter will improve emitter artifacts with a tradeoff of lower signal to noise ratio in the sensor. Generally, reducing pulse duration will improve emitter artifacts with a tradeoff of lower signal to noise ratio in the sensor.

In general, the firing time of the emitter, the firing dosage of the emitter may be adjusted to reduce emitter artifacts. Alternatively or additionally, the display may be adjusted, or the acceptable range of artifacts may be increased (e.g., if the content on the display and/or the environmental conditions reduce the visible artifacts on the display).

Figure 4:
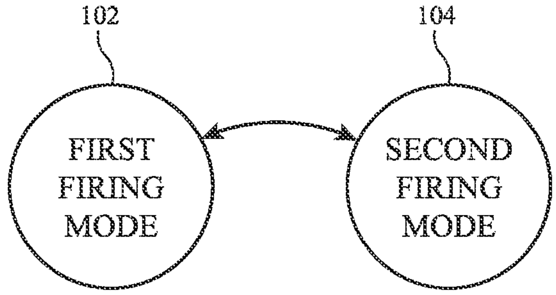
FIG. 4 is a state diagram of an illustrative light emitter in an environmental sensor in accordance with some embodiments.

In some cases, the emitter may be operable in first and second firing modes shown in the state diagram of FIG. 4. In first firing mode 102, the emitter may operate using first properties. In the second firing mode 104, the emitter may operate using second properties. At least one of the firing dosage and/or the firing time of the light emitter may be different between mode 102 and mode 104.

In some cases, the firing mode of the emitter may be determined without factoring in mitigation of emitter artifacts. For example, the firing mode may have a high firing frequency in the first mode and a lower firing frequency in the second mode. The emitter may be placed in the first mode when a device use case dictates a high sensitivity and the emitter may be placed in the second mode when a device use case does not require such a high sensitivity. Alternatively or in addition, the emitter may be placed in one of the first and second modes at least partially based on emitter artifact considerations. For example, the emitter artifacts may be lower when the emitter operates in the second mode than when in the first mode. Accordingly, when a situation is detected where the display is vulnerable to emitter artifacts (e.g., low ambient light conditions), the emitter may be placed in the second mode. When a situation is detected where the display is less vulnerable to emitter artifacts (e.g., high ambient light conditions), the emitter may be placed in the first mode.

Figure 5A:
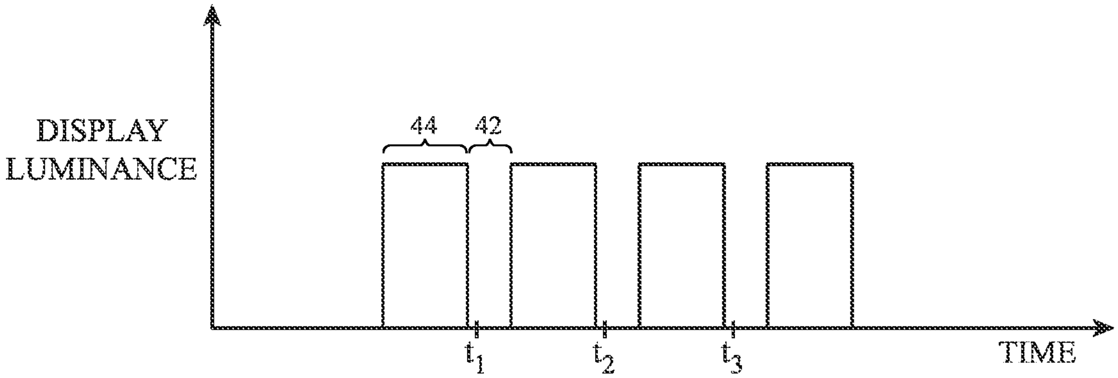
FIG. 5A is a graph of display luminance over time for an illustrative display in accordance with some embodiments.
Figure 5B:
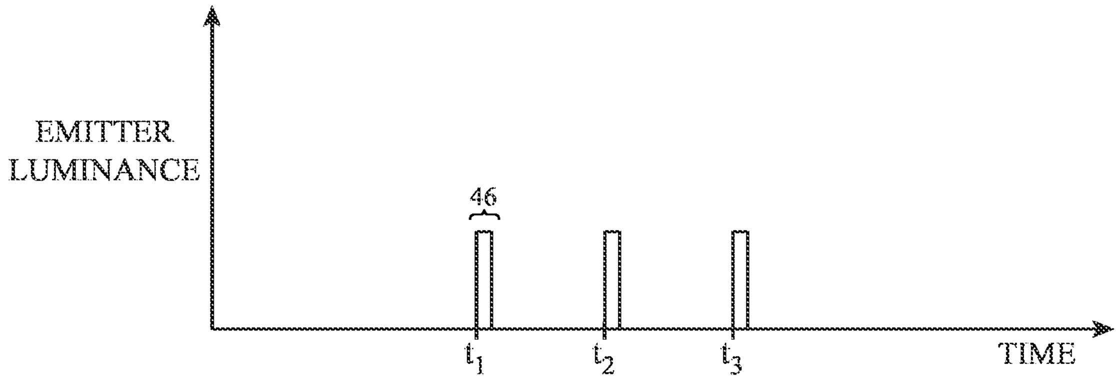
FIG. 5B is a graph of emitter luminance over time for an illustrative light emitter in accordance with some embodiments.
Figure 5C:
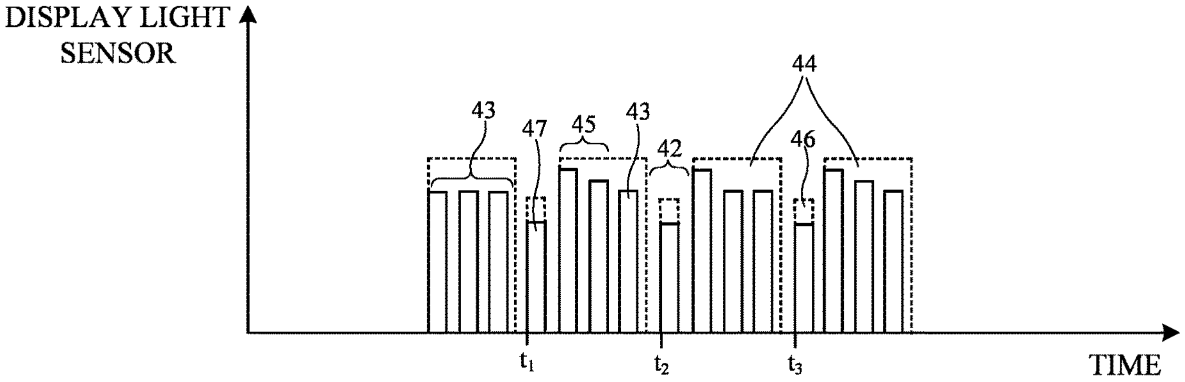
FIG. 5C is a graph of under display light sensor measurements over time for an illustrative display light sensor in accordance with some embodiments.

A technique for sensing and mitigating emitter artifacts is shown in FIGS. 5A-5C. FIG. 5A shows display luminance over time whereas FIG. 5B shows emitter luminance over time. As shown in FIG. 5A, display 14 may operate in a series of display frames that each have a blanking period 42 and an emission period 44. The blanking periods 42 are interposed between emission periods 44. To reduce emitter artifacts, pulses from the emitter may be synchronized with blanking periods 42. As shown in FIG. 5B, the emitter may fire at $t_1$ (which is during a first blanking period in FIG. 5A), $t_2$ (which is during a second blanking period in FIG. 5A), and $t_3$ (which is during a third blanking period in FIG. 5A).

Electronic device 10 may be designed such that the duration of blanking periods 42 are greater than the duration of the firing duration 46 for the emitter. In this way, the emitter pulses may be included entirely within a given blanking period.

In some cases, display 14 may be tunable between different modes with different blanking mode frequencies and durations. In this case, the emitter may be tuned between multiple firing modes to a firing mode that best aligns with the blanking periods of the current display mode.

The duration of a display frame may be defined as the time between the beginning of an emission period (e.g., emission period 44 in FIG. 5A) and the end of a blanking period (e.g., blanking period 42). The end of the blanking period corresponds to the beginning of the emission period for the next frame. Due to the display's TFT pixel circuit operation, changing the emitter firing time relative to the display frame may impact the emitter artifacts. For example, for static emitter conditions (e.g., constant firing frequency/pulse duration) and static display conditions (e.g., same content is displayed over the emitter, same refresh rate, same display hardware, etc.), sweeping the firing time of a pulse from the light emitter from the beginning of a display frame to the end of a display frame may gradually change the emitter artifact (e.g., from brighter than the surrounding display to dimmer than the surrounding display). At some point when sweeping the firing time of a pulse from the light emitter from the beginning of a display frame to the end of a display frame, the emitter artifact may be below JND levels. Therefore, there is an optimal firing time for the emitter that may be used to mitigate the emitter artifacts. In some embodiments, a display light sensor may be incorporated under the display to measure the emitter artifacts. The firing time of the emitter, the firing dosage of the emitter, and/or the display may be adjusted in response to measured emitter artifacts. An illustrative graph of display light sensor measurements is shown in FIG. 5C.

As shown in FIG. 5C, at times 43, the display light sensor may have constant measurements. Since this is before firing time $t_1$ (e.g., before firing duration 46), times 43 may be baseline measurements. In other words, at times 43, the display light sensor measurements may include display backside light leakage without any display artifacts.

At time 47, which occurs starting at time $t_1$, the display light sensor may have a lower measurement than at times 43. In particular, because the display is blanked during this time (see blanking period 42), the display light sensor will have a lower reading. In other words, because the display does not emit light during this period, the display light sensor will have a lower reading of the display's light leakage.

At times 45, the display light sensor may detect artifacts in the display caused by the sensor emitter. In particular, the display is reactivated at this time (see emission period 44), and the sensor emitter has fired. The light emitted by the sensor emitter may cause display artifacts, which are shown in FIG. 5C as an increased measurement by the display light sensor.

To determine the magnitude of the emitter artifacts, control circuitry in the device (such as control circuitry 16 of device 10) may subtract the display sensor measurements at times 45 from the baseline measurements (e.g., the display sensor measurements at times 43). In this way, the control circuitry may determine whether the sensor emitter has caused artifacts in the display based on the measurements from the display light sensor, as well as the magnitude of these artifacts, if desired. Although control circuitry 16 has been described as determining the presence and/or magnitude of display artifacts, this is merely illustrative. In general, any circuitry in device 10 may make this determination. An illustrative side view of a portion of a device having a display light sensor to measure display artifacts is shown in FIG. 6.

Figure 6:
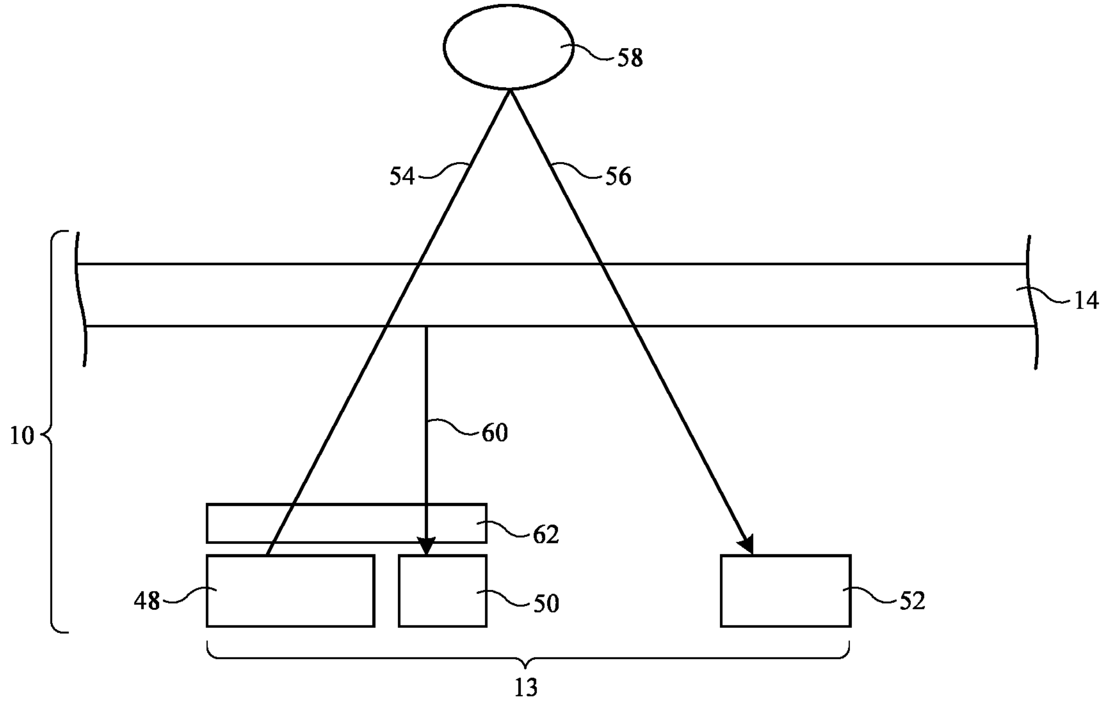
FIG. 6 is a side view of an illustrative electronic device having an environmental sensor and a display light sensor in accordance with some embodiments.

As shown in FIG. 6, device 10 may include display 14 through which sensor 13 operates. In other words, sensor 13 may be an under-display sensor. Sensor 13 may be an environmental sensor, such as a proximity sensor, LIDAR sensor, or other light-based sensor that makes measurements of the environment and/or objects external to device 10. In some embodiments, sensor 13 may include a light emitter that operates using non-visible-wavelength light and a corresponding light detector that detects light at the non-visible wavelength. In the example of FIG. 6, sensor 13 may have light emitter 48 and light sensor 52. Light emitter 48 may be, for example, an infrared (IR) light emitter or an ultraviolet (UV) light emitter. Light sensor 52 may detect light at the same wavelength as light emitted by light emitter 48, and may be an IR light sensor for an IR light emitter or a UV light sensor for a UV light emitter, as examples.

In operation, light emitter 48 may emit light 54 through display 14 toward external object 58. At least some of the light may reflect off of external object 58 as light 56. Light 56 may be detected by light sensor 52. Sensor 13 may then determine the proximity of object 58, the presence of object 58, the type of object 58, or other desired characteristic(s) of object 58. In this way, sensor 13 may operate through display 14.

As discussed, light 54 passing through display 14 may cause artifacts on display 14 depending on the wavelength of light 54, as well as the timing of emitting light 54 relative to images being displayed on display 14. To determine whether artifacts are present on display 14, a display light sensor, such as display light sensor 50 of FIG. 6, may be incorporated into device 10.

Display light sensor 50 may be an ambient light sensor, such as a color ambient light sensor, or a camera or other image sensor. For example, display light sensor 50 may include a plurality of photodiodes with corresponding color filters (such as red, green, and blue color filters). The photodiodes may measure light of the same color as its respective color filter, and display light sensor 50 may determine the color of light. Alternatively, display light sensor 50 may have one or more photodiodes without color filters to sense the amount of light incident on the sensor, or display light sensor 50 may be a camera having an image sensor with a similar response to light as display 14. However, these examples are merely illustrative. In general, display light sensor 50 may be any sensor that measures light from display 14.

As shown in FIG. 6, display light sensor 50 is formed under display 14, and display light sensor 50 may be referred to as an under-display light sensor herein. Display light sensor 50 may detect light 60. Light 60 may correspond to light that is leaked out of the backside of display 14. In other words, light 60 may be backside light leakage of display 14.

Beam splitter 62 may optionally overlap light emitter 48 and/or display light sensor 50. Beam splitter 62 may allow light 54 emitted by light emitter 48 to pass toward display 14. Beam splitter 62 may allow light 60 to pass to display light sensor 50. In particular, beam splitter 62 may allow the red, green, and blue (RGB) backside leakage light from display 14 to pass through to display light sensor 50, and may split the red, green, and blue components of light 60, if desired. The amount of red, green, and blue backside leakage from display 14 is related to the amount artifacts in the image produced by display 14. In this way, display light sensor 50 may measure the amount of red, green, and blue backside leakage in display 14, which may be correlated to the presence and/or magnitude of artifacts in display 14.

Although FIG. 6 shows beam splitter 62 overlapping display light sensor 50, this is merely illustrative. If desired, beam splitter 62 may be omitted from device 10. Display light sensor 50 may still measure backside leakage from the display in these embodiments.

Alternatively or additionally, there may be multiple display light sensors in device 10, such as at least 2 display light sensors, at least 3 display light sensors, or at least 5 display light sensors, as examples. In embodiments in which multiple display light sensors are used, one display light sensor may be formed adjacent to a light sensor emitter, while a second display light sensor may be incorporated elsewhere in the display. The measurements of the first and second display light sensors may be used to determine whether display artifacts are present near the sensor emitter. In other words, the second display light sensor may be used for calibration. In some embodiments, display light sensors may be arranged in an array behind the display to measure display artifacts at different portions of the display.

Figure 7A:
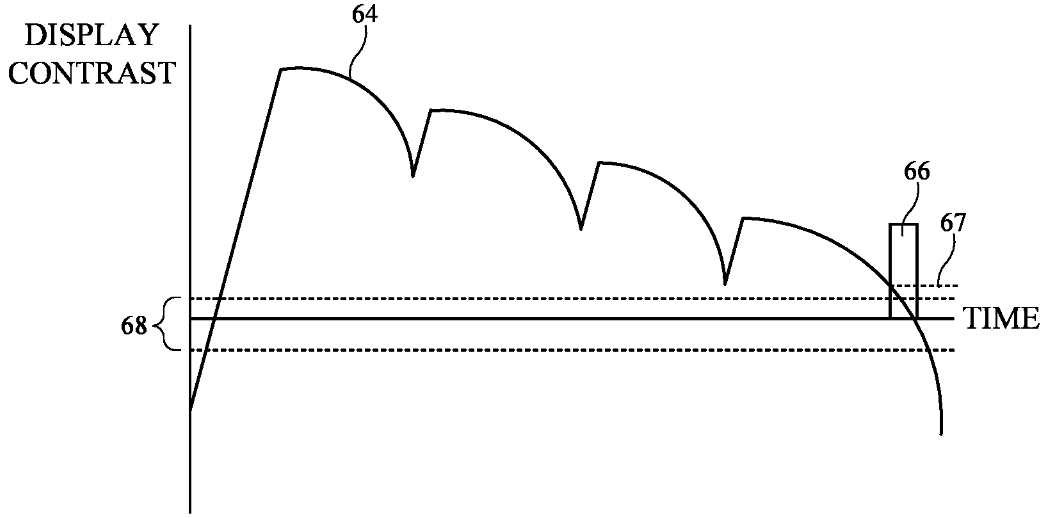
FIGS. 7A-7E are graphs of illustrative adjustments that may be made to the sensor and/or display to reduce display artifacts in accordance with some embodiments.

An illustrative example of a display light sensor measurement reflective of artifacts in a display is shown in FIG. 7A. As shown in FIG. 7A, curve 64 is an illustrative relationship between display contrast and time (e.g., over an image frame of the display). In general, the display contrast will increase when pixels in the display emit light, and reach local minima when the display is blanked. In the example of FIG. 7A, a light emitter in an under-display sensor may emit light (e.g., fire) at firing time 66. A display light sensor, such as display light sensor 50, may measure the backside leakage of the display, which is indicated by measurement 67.

Some artifacts may be unnoticeable by a user, or may otherwise be acceptable on a display. To account for this, range 68 may be provided. Within range 68, artifacts may be acceptable, while outside of range 68, corrective action will be taken. In some embodiments, range 68 may correspond to the just-noticeable difference (JND) level at which artifacts are detectable by a user. In general, however, range 68 may be any desired range of emitter artifacts.

In the illustrative example of FIG. 7A, display light sensor measurement 67 is outside of range 68. In response to determining that the display light measurement is outside of range 68, control circuitry may adjust the sensor and/or the display. Illustrative examples of adjustments that may be performed to reduce display artifacts are shown in FIGS. 7B-7E.

Figure 7B:
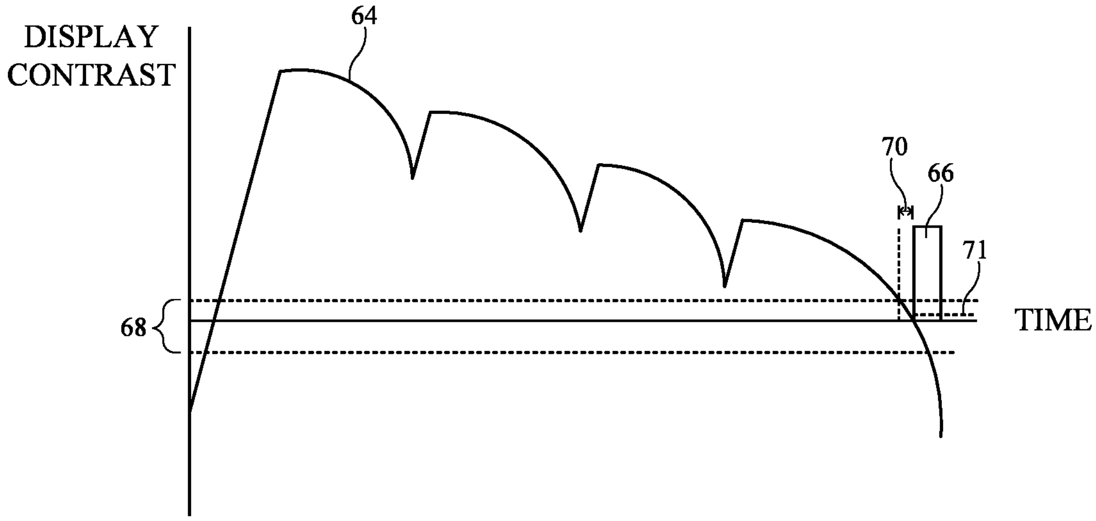

As shown in FIG. 7B, for example, firing time 66 of the light-emitter may be delayed, such as by time 70. By delaying firing time 66 to a later point in the display curve 64 (e.g., later in the image frame or in a later image frame), display artifacts may be reduced. For example, the display light sensor measurement may be lower, as indicated by display light measurement 71. Because display light measurement 71 is within range 68, any artifacts in the display may be acceptable (e.g., the artifacts may be below the just-noticeable difference level).

Figure 7C:
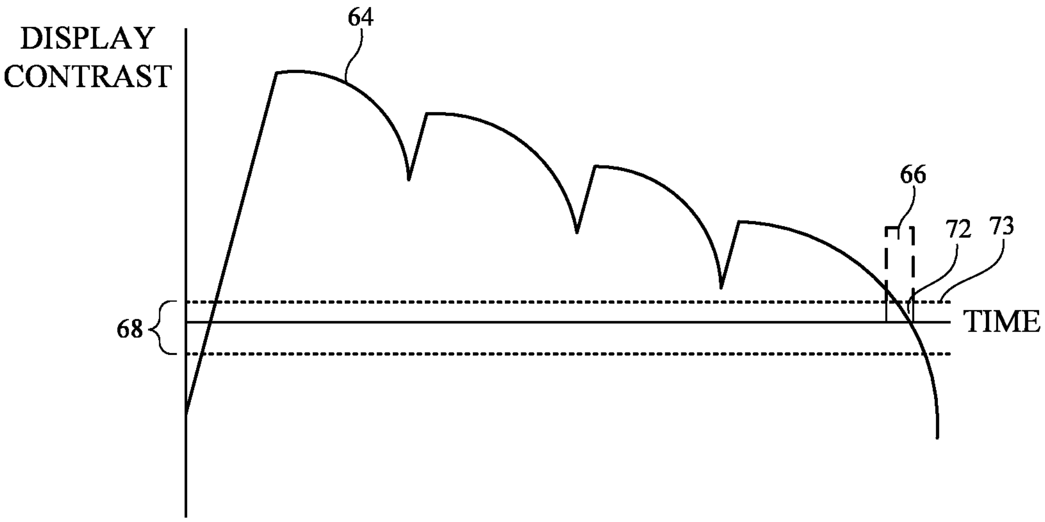

Alternatively or additionally, the firing dosage (e.g., the amount of light emitted) of the light emitter may be reduced. In the example of FIG. 7C, the firing dosage has been reduced from the firing at firing time 66 to the firing at firing time 72. As a result, the impact of the light from the emitter may be reduced, and the display artifacts may be reduced. For example, the display light sensor measurement may be lower, as indicated by display light measurement 73. Because display light measurement 73 is within range 68, any artifacts in the display may be acceptable (e.g., the artifacts may be below the just-noticeable difference level).

Figure 7D:
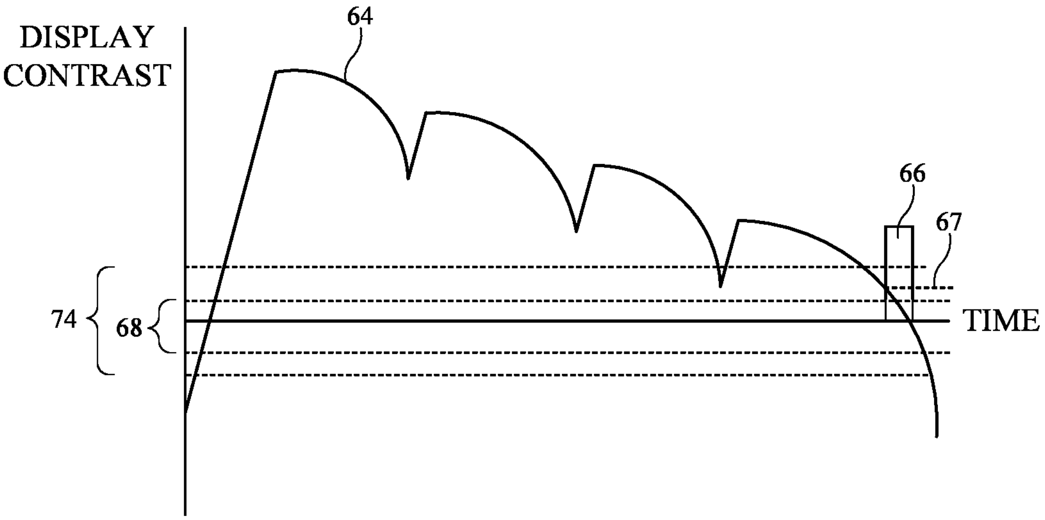

In addition to, or as an alternative to, one or both of the firing time or firing dosage adjustments, the acceptable artifact range may be increased. For example, a user of the display may be viewing content on the display that is less disturbed by display artifacts and/or the display may be used in environmental lighting conditions that make display artifacts less noticeable to a user. In the example of FIG. 7D, range 68 has been increased to range 74. Although display light sensor measurement 67 is the same as in the example of FIG. 7A, it is now within the adjusted acceptable artifact range.

Figure 7E:
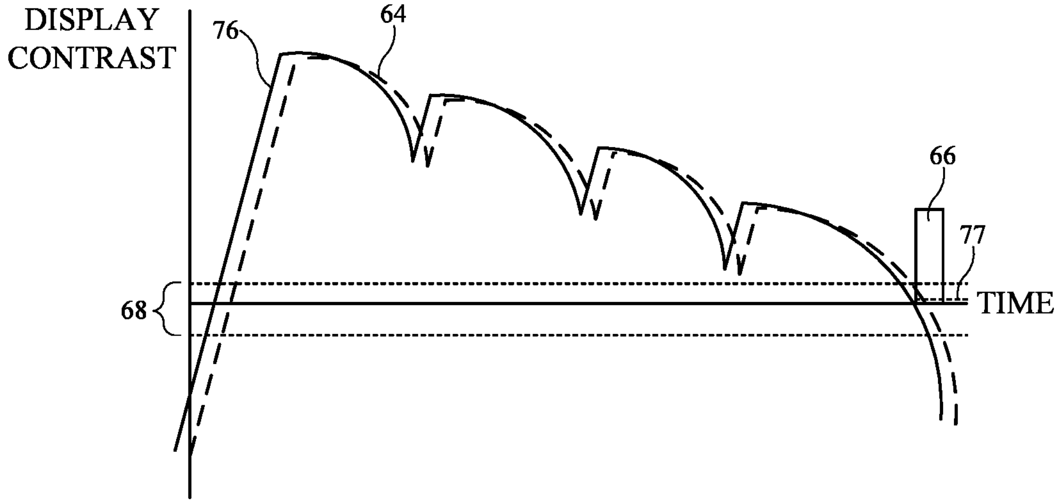

Instead of, or in addition to, adjusting the light sensor emitter and/or the acceptable artifact range, the display output may be adjusted. For example, the display pixel output may be offset (e.g., shifted earlier or later in time). As shown in FIG. 7E, for example, the display output has been shifted from curve 64 to curve 76. Because light emitter firing time 66 occurs when there is less display output, there may be fewer artifacts on the display, as indicated by display light measurement 77. Display light measurement 77 is now within acceptable artifact range 68.

Figure 8:
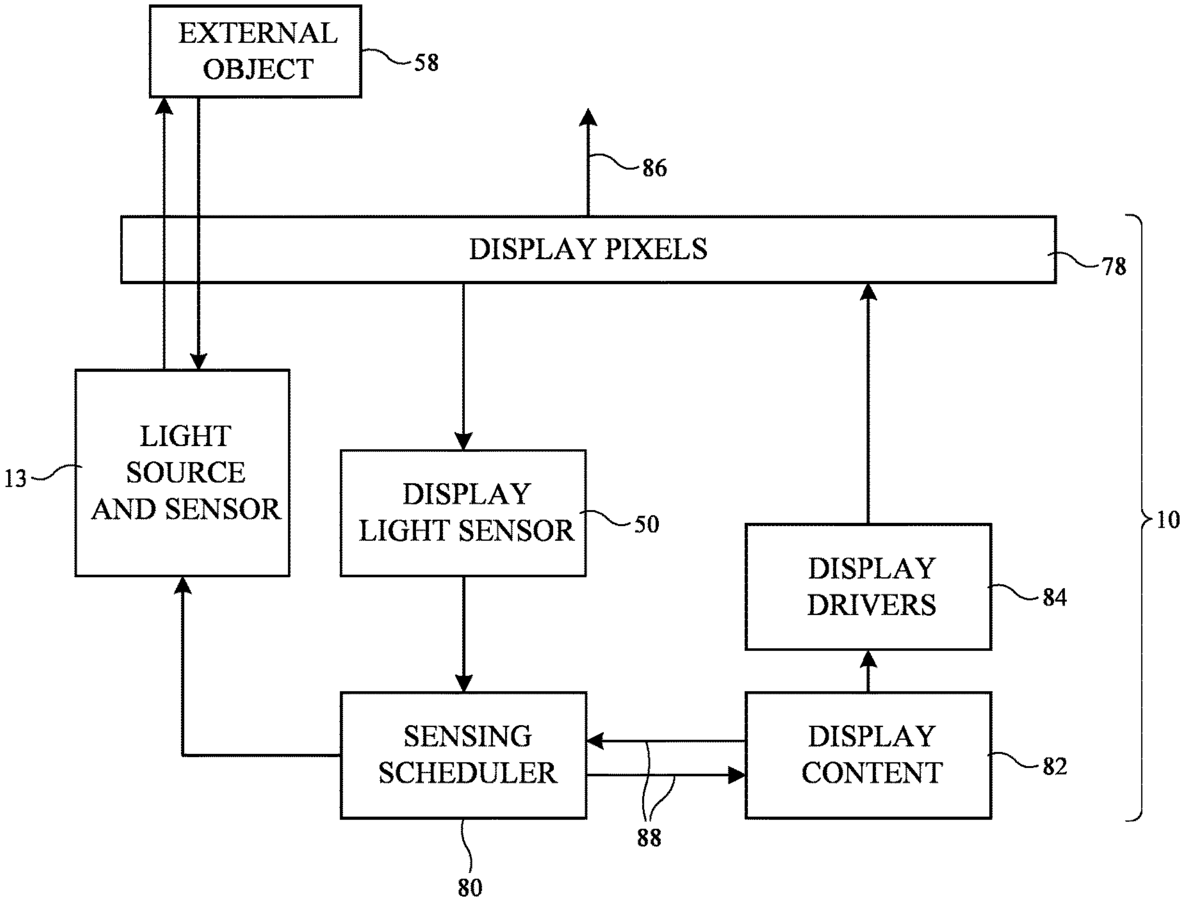
FIG. 8 is a schematic diagram of an illustrative electronic device having a display light sensor to determine an optimal firing time for a light emitter in an environmental sensor in accordance with some embodiments.

FIG. 8 is a schematic diagram of an illustrative electronic device having an under-display sensor and a display light sensor to determine whether the under-display light sensor has caused artifacts on the display. As shown in FIG. 8, electronic device 10 may include display pixels 78, which may be a part of display 14 of FIG. 1. Display pixels 78 may emit light 86 as an image that may be viewed by a user of device 10. Display drivers 84 may be formed from integrated circuits or other circuitry that drives display pixels 78 to emit light 86. Display drivers 84 may adjust display pixels 78 based on display content 82, which may be received from control circuitry or other circuitry in device 10.

Sensor 13, which may include a light source and a light sensor, may be formed behind display pixels 78 (e.g., under the display of device 10). As previously discussed, sensor 13 may emit light toward external object 58 and may detect light that reflects from external object 58 to detect the proximity or other characteristic of object 58. In this way, sensor 13 may be a proximity sensor. In general, however, sensor 13 may be any sensor that operates through the display, such as any desired environmental sensor.

Display light sensor 50 may detect backside leakage from pixels 78 to determine whether light emitted by sensor 13 has created artifacts in the images displayed by pixels 78. Display light sensor 50 may be an ambient light sensor, camera, or other light sensor.

Sensing scheduler 80 may use the measurements from display light sensor 50 to determine if artifacts are present and/or if the artifacts are outside of an acceptable artifact range (such as range 68 of FIG. 7A). Sensing scheduler 80 may be formed by one or more microprocessors, microcontrollers, digital signal processors, baseband processors, or application-specific integrated circuits, as examples. In some embodiments, sensing scheduler 80 may be a part of control circuitry, such as control circuitry 16, of device 10.

Sensing scheduler 80 may control the light emitter in sensor 13 to begin emitting light (e.g., firing) at an optimal firing time to reduce the artifacts in the images displayed by pixels 78. In particular, sensing scheduler 80 may change the firing time (as shown in FIG. 7B), the firing dosage (as shown in FIG. 7C), and/or the acceptable artifact range (as shown in FIG. 7D). In this way, sensing scheduler 80 may adjust sensor 13 in response to determining that light emitted by sensor 13 is causing or has caused artifacts in the display.

Sensing scheduler 80 may also be in bilateral communication 88 with the display. In particular, sensing scheduler 80 may adjust the display content 82, such as by adjusting the time at which image frames are displayed by pixels 78 (as shown in FIG. 7E). Other adjustments that may be made to the display include the brightness, refresh rate of the display. In some embodiments, sensing scheduler 80 may send a signal to control circuitry, such as control circuitry 16, of device 10 regarding the presence of artifacts in the display, and the control circuitry may adjust the displayed images in response to that signal. Alternatively, sensing scheduler 80 may make the adjustment to the displayed content directly (e.g., by sending signals directly to display drivers 84).

By using display light sensor 50 to determine whether artifacts are present in the display and having sensing scheduler 80 in bilateral communication with the display, a closed-loop system may be formed. In particular, sensor 13 and/or pixels 78 of the display may be adjusted based measurements from display light sensor 50.

Figure 9:
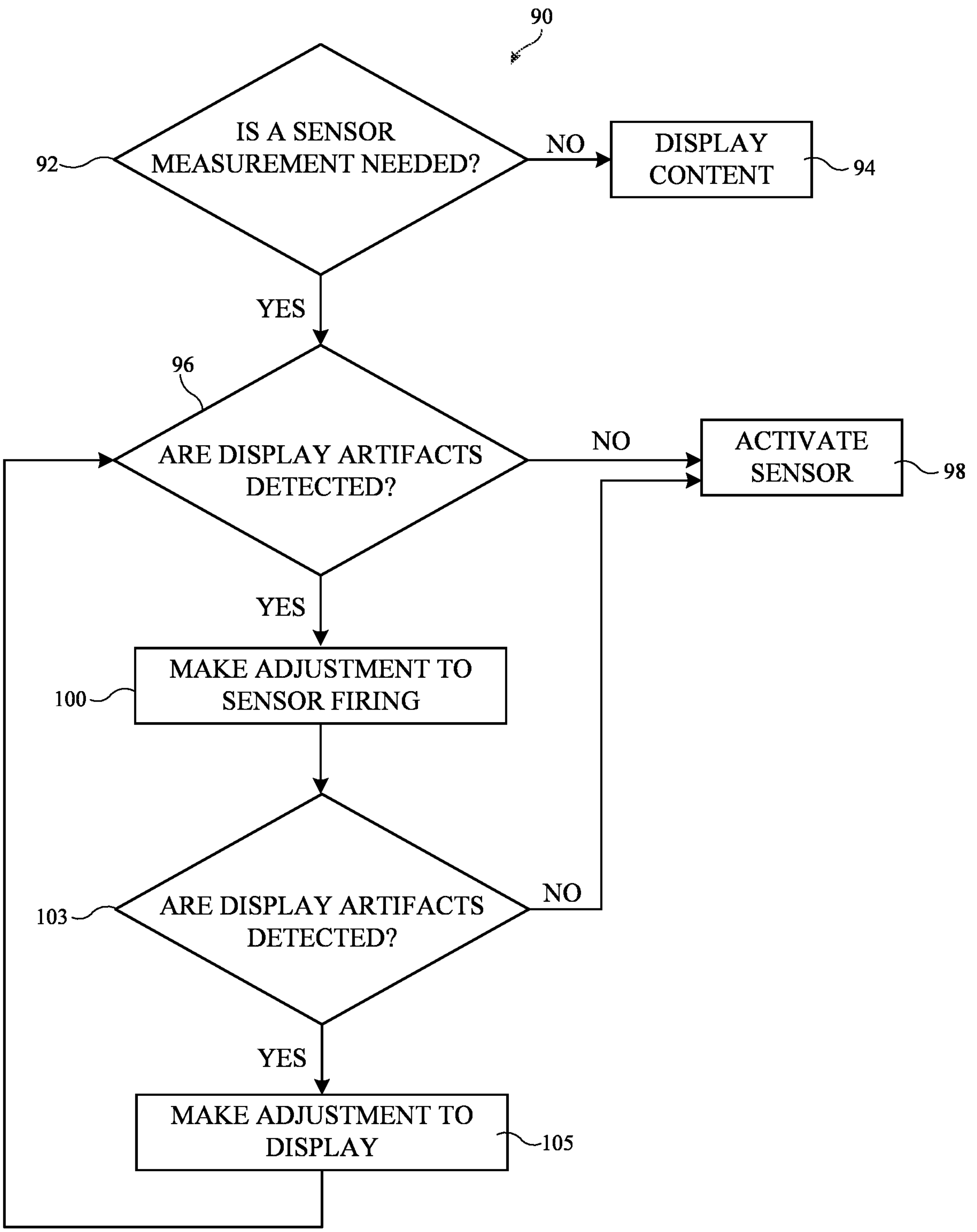
FIG. 9 is a flowchart of illustrative steps that may be used in synchronizing a light emitter and a display based on feedback from a display light sensor in accordance with some embodiments.

Illustrative steps that may be used in measuring artifacts in a display and making adjustments to the display and/or an under-display sensor are shown in FIG. 9.

As shown in FIG. 9, method 90 may include, in step 92, determining whether a sensor measurement is needed. The sensor measurement may be, for example, a measurement by an under-display sensor that takes measurements of external objects or the external environment. In some illustrative embodiments, the under-display light sensor is a proximity sensor with a light emitter (such as an infrared light emitter) and a light sensor.

If a sensor measurement is not needed, at step 94, content may be displayed on the display that overlaps the under-display sensor. Because the light emitter in the under-display sensor is not emitting light, content may be displayed without concern of artifacts induced by the light emitter.

On the other hand, if a sensor measurement is needed and the sensor is used, at step 96, a display light sensor may be used to determine whether artifacts are detected in the images produced by the display. For example, the display light sensor may be located under the display and may measure the backside leakage of the display.

If the display light sensor detects no artifacts or artifacts within an acceptable range (e.g., a just-noticeable difference range, or other desired range), then the sensor may continue to emit light and make measurements at step 98.

If the display light sensor detects artifacts that are outside of the acceptable range, then the sensor may be adjusted at step 100. As examples, the firing time of the light emitter, the firing dosage of the light emitter, and/or the acceptable artifact range may be adjusted (as shown in FIGS. 7B-7D).

After adjusting the sensor, at step 103, the display light sensor may be used again to determine whether artifacts are detected in the images produced by the display.

If the display light sensor detects no artifacts or artifacts within an acceptable range (e.g., a just-noticeable difference range, or other desired range), then the sensor may continue to emit light and make measurements at step 98.

If the display light sensor detects artifacts that are outside of the acceptable range, then the display may be adjusted at step 105. As an example, the output of the display may be offset (e.g., shifted) so that the firing of the light emitter causes fewer artifacts on the displayed image (as shown in FIG. 7E). Alternatively or additionally, other adjustments, such as the brightness of the display or the content of the images displayed, may be made to the display.

After adjusting the sensor, at step 96, the display light sensor may be used again to determine whether artifacts are detected in the images produced by the display, and the cycle may continue.

If desired, any two or more of the aforementioned emitter artifact mitigation techniques may be used in a single instance. For example, one or more sensor adjustments and/or one or more display adjustments may be made in response to determining that artifacts are present on a displayed image.

The example of FIG. 9, in which the display light sensor checks for artifacts only between emissions by the sensor, is merely illustrative. In general, any desired process may be used to determine whether a light emitter is causing display artifacts using a display light sensor. For example, the display light sensor may use measurements from previous image frames to adjust the light emitter, the display light sensor may average measurements over multiple image frames to adjust the light emitter, etc.

Additionally, the order of the adjustments in FIG. 9 is merely illustrative. If desired, the display adjustments at step 105 may be made prior to, or concurrently with, the sensor adjustments at step 100. In general, adjustments to mitigate display artifacts may be made in any desired order.

Although not shown in FIG. 9, the emitter artifact mitigation techniques may be tailored to the real-time ambient light conditions. For example, less processing-intensive emitter artifact mitigation may be used when ambient light conditions are bright (and emitter artifacts are less noticeable) whereas more processing-intensive emitter artifact mitigation may be used when ambient light conditions are dim (and emitter artifacts are more noticeable).

In the examples of FIGS. 5-9, a display light sensor (e.g., display light sensor 50) is described as being used to detect artifacts in a display to make adjustments to a sensor and/or the display. However, the display light sensor may be used for other functions, as well. For example, the display light sensor may be used to calibrate the display. In other words, by measuring the backside leakage of the display, adjustments may be made to the white point, color correction, gamma correction, or other display settings of the display.

The example herein of mitigating emitter artifacts from an infrared light source in a proximity sensor is merely illustrative. In general, the emitter artifact mitigation techniques described herein may be applied to any type of emitter that operates through display 14 (e.g., a light source that is part of a sensor other than a proximity sensor or a light source that is not part of a sensor). In general, the emitter artifact mitigation techniques described herein may be applied emitters that operate at any wavelengths (e.g., infrared, ultraviolet, etc.).

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a display;
a sensor comprising a light emitter that emits light through the display;
a display light sensor configured to measure emitter artifacts on the display; and
control circuitry configured to adjust the light emitter and to adjust a firing dosage of the light emitter in response to the emitter artifacts exceeding a predetermined range.

2. The electronic device of claim 1, wherein the control circuitry is further configured to adjust a firing time of the light emitter in response to the emitter artifacts exceeding the predetermined range.

3. The electronic device of claim 1, wherein the control circuitry is further configured to adjust the predetermined range in response to the emitter artifacts exceeding the predetermined range.

4. The electronic device of claim 1, wherein the control circuitry is further configured to adjust the display in response to the emitter artifacts exceeding the predetermined range.

5. The electronic device of claim 4, wherein the control circuitry is configured to adjust an output timing of the display in response to the emitter artifacts exceeding the predetermined range.

6. The electronic device of claim 1, wherein the display light sensor is configured to measure the emitter artifacts by measuring backside light leakage from the display.

7. The electronic device of claim 6, wherein the display light sensor is an ambient light sensor.

8. The electronic device of claim 6, wherein the display light sensor is a camera.

9. The electronic device of claim 1, wherein the control circuitry comprises a sensing scheduler that is in bilateral communication with the display, and wherein the sensing scheduler is configured to adjust the light emitter and the display in response to the emitter artifacts exceeding the predetermined range.

10. The electronic device of claim 9, wherein the predetermined range is limited to a just-noticeable artifact level on the display.

11. The electronic device of claim 1, wherein the sensor comprises a proximity sensor, the light emitter comprises an infrared light emitter, and the sensor further comprises an infrared light detector.

12. An electronic device, comprising:
a display;
a sensor configured to operate through the display;
a display light sensor under the display, wherein the display light sensor is configured to measure backside light leakage from the display; and
control circuitry configured to adjust the display based on measurements from the backside light leakage, wherein the control circuitry is configured to determine whether emitter artifacts in the display exceed a predetermined range, and wherein the control circuitry is configured to adjust content on the display in response to determining that the emitter artifacts exceed the predetermined range.

13. The electronic device of claim 12, wherein the sensor comprises a light emitter.

14. The electronic device of claim 13, wherein the control circuitry is further configured to adjust an output timing of the display in response to the emitter artifacts exceeding the predetermined range.

15. The electronic device of claim 13, wherein the control circuitry is further configured to adjust the light emitter in response to the emitter artifacts exceeding the predetermined range.

16. The electronic device of claim 15, wherein the control circuitry is configured to adjust a firing time of the light emitter, a firing dosage of the light emitter, or the predetermined range in response to the emitter artifacts exceeding the predetermined range.

17. An electronic device, comprising:
a display comprising pixels;
a proximity sensor comprising a light emitter that emits light through the display;
a display light sensor that measures emitter artifacts in light emitted by the pixels; and
control circuitry that includes a sensing scheduler that is in bilateral communication with the display, wherein the sensing scheduler is configured to adjust the display or the proximity sensor in response to determining the emitter artifacts exceed a predetermined range.

18. The electronic device of claim 17, wherein the display light sensor measures backside light leakage from the display to measure the emitter artifacts, and wherein the display light sensor is an ambient light sensor or a camera.

* * * * *